(12) United States Patent
Qu et al.

(10) Patent No.: US 10,013,838 B2
(45) Date of Patent: Jul. 3, 2018

(54) GATE DEVICE (71) Applicant: GRG Banking Equipment Co., Ltd., Guangzhou, Guangdong (CN)

(72) Inventors: Jingjing Qu, Guangdong (CN); Hongjun Wu, Guangdong (CN); Zhongwu Lai, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/574,177

(22) PCT Filed: May 17, 2016

(86) PCT No.: PCT/CN2016/082302
§ 371 (c)(1),
(2) Date: Nov. 15, 2017

(87) PCT Pub. No.: WO2016/188341
PCT Pub. Date: Dec. 1, 2016

(65) Prior Publication Data
US 2018/0137711 A1 May 17, 2018

(30) Foreign Application Priority Data
May 28, 2015 (CN) .......................... 2015 1 0282923

(51) Int. Cl.
*G07F 1/00* (2006.01)
*G07D 11/00* (2006.01)
*F16H 19/04* (2006.01)
(52) U.S. Cl.
CPC ......... *G07D 11/0018* (2013.01); *F16H 19/04* (2013.01); *G07D 11/0048* (2013.01)

(58) Field of Classification Search
CPC .. G07D 11/0018; G07D 11/0048; F16H 19/04
(Continued)

(56) References Cited

U.S. PATENT DOCUMENTS

2009/0217596 A1* 9/2009 Neundorf ................ E05B 81/20
49/506
2015/0317858 A1* 11/2015 Suetaka ................. G07D 13/00
194/351

FOREIGN PATENT DOCUMENTS

CN 101527060 A 9/2009
CN 101684713 A 3/2010
(Continued)

OTHER PUBLICATIONS

International Search Report and Written Opinion for Application No. PCT/CN2016/082302 dated Aug. 19, 2016.

*Primary Examiner* — Jeffrey A Shapiro
(74) *Attorney, Agent, or Firm* — Wolf, Greenfield & Sacks, P.C.

(57) ABSTRACT

A gate device includes a base plate, a gate, and a power system for driving the gate to slide, the base plate has an opening, the gate is arranged on an inner side of the base plate, a rack is provided on an inner side of the gate in an opening-closing direction, and the power system includes a bi-directional power motor having a power output gear; a first transmission gear engaged with the power output gear and configured to drive a second transmission gear by a first transmission shaft, and the second transmission gear being engaged with the rack; and a third transmission gear engaged with the first transmission gear and configured to drive a sleeve component by a screw rod to make a reciprocation movement in a direction perpendicular to a sliding direction of the gate on a plane in parallel with the gate.

10 Claims, 11 Drawing Sheets

(58) Field of Classification Search
USPC .............. 194/206, 207, 351; 235/1 A, 379;
209/534; 74/22 R, 22 A, 23, 24, 25,
74/29–35, 45, 46, 70, 76, 79, 89.11,
74/89.12, 89.17, 109, 120, 130, 132, 840,
74/842, 422, 424.5, 424.6; 49/136, 139,
49/140, 349, 404, 414–419; 232/44
See application file for complete search history.

(56) References Cited

FOREIGN PATENT DOCUMENTS

| | | |
|---|---|---|
| CN | 102289863 A | 12/2011 |
| CN | 203338449 U | 12/2013 |
| CN | 104167044 A | 11/2014 |
| CN | 104537740 A | 4/2015 |
| CN | 104851185 A | 8/2015 |
| KR | 101155188 B1 | 6/2012 |
| KR | 101170559 B1 | 8/2012 |

* cited by examiner

GATE DEVICE

The present application is the national phase of International Application No. PCT/CN2016/082302, titled "GATE DEVICE", filed on May 17, 2016, which claims priority to Chinese patent application No. 201510282923.5 titled "NOVEL GATE DEVICE", filed with the Chinese State Intellectual Property Office on May 28, 2015, the entire disclosures of both applications are incorporated herein by reference.

FIELD

The present application relates to a safety gate mechanism, and in particular to a gate device applied at a cash deposit/withdrawal opening of a self-service financial apparatus.

BACKGROUND

Currently, self-service financial apparatuses are widely used by people, and the self-service apparatuses arranged separately can provide 24 hours of uninterrupted service for users, thereby providing convenience for people's life. But cashes in unattended self-service financial apparatuses tend to stolen by criminals with some special means, and the cash deposit/withdrawal opening as a window for accommodating and delivering cashes in the self-service financial apparatus naturally becomes the most vulnerable area, and is most easily to be illegally destructed by criminals for performing illegal operations.

Certainly, a gate device is provided at the cash deposit/withdrawal opening of the self-service financial apparatus, and a locking mechanism for opening the gate device only at the time of depositing and withdrawing cashes and closing and locking the gate device at other times is also provided. However, the current gate devices generally employ a swingable blocking member to prop the gate, to achieve the purpose of locking the gate. Since there is a gap between the gate and a base plate of the gate when the gate device is assembled, criminals may insert some rigid sheets through the gap to pull the locking mechanism of the gate to open the gate, which causes insecure factors to the self-service financial apparatus.

For improving the security and reliability of the gate device, a novel gate mechanism is provided according to the present application, which employs only one power motor, and locks the gate by a screw rod and sleeve mechanism, and the gate can be locked in both opened and closed states, and the mechanism cannot be pulled by a rigid sheet and has the characteristics, including simple structure, small occupation space, easy to control and high security and reliability.

SUMMARY

In view of the technical issue in the conventional technology that a gate device may be illegally opened, an object of the present application is to provide a novel gate device which has a simple structure, a small occupation space and a high security and reliability, and is easy to control.

The novel gate device includes a base plate, a gate, and a power system configured to drive the gate to slide, the base plate has an opening, the gate is arranged on an inner side of the base plate, a rack is provided on an inner side of the gate in an opening-closing direction, and the gate is driven by the power system to slide to open or close the opening, and the power system includes:

a power motor, wherein the power motor has a power output gear and is a bi-directional motor;

a first transmission gear, wherein the first transmission gear is assembled with the power output gear in a meshing manner, and configured to drive a second transmission gear by a first transmission shaft, and the second transmission gear is assembled with the rack in the meshing manner; and a third transmission gear, wherein the third transmission gear is assembled with the first transmission gear in the meshing manner, and is configured to drive a sleeve component by a screw rod to make a reciprocation movement in a direction perpendicular to a sliding direction of the gate on a plane in parallel with the gate, and the reciprocation movement of the sleeve component is configured to lock and unlock the gate.

Preferably, the sleeve component is provided with an engaging foot configured to retain the gate, and the gate is provided with an engaging arm configured to selectively engage with the engaging foot arranged on the sleeve component.

Preferably, the gate is provided with a stop strip at a side close to the sleeve component, and the stop strip is configured to limit a maximum stroke point of the movement of the sleeve component on the screw rod; and the stop strip abuts against the sleeve component when the gate is opened fully, to lock the gate.

Preferably, the sleeve component is provided with a restricting platform at a side close to the base plate, and the restricting platform is configured to restrict the sleeve component from rotating along with the screw rod.

Preferably, the gate device further includes a first sensor configured to detect whether the sleeve component is moved to a designated position, and the sleeve component is provided with a detecting arm configured to be selectively sensed by the first sensor.

Preferably, the gate device further includes an opening position detecting sensor configured to detect whether the gate is opened fully and a closing position detecting sensor configured to detect whether the gate is closed fully.

The gate device has the following advantages compared with the conventional technology.

The gate device employs one power motor, and the gate is locked by a screw rod and sleeve mechanism, and can be locked in both opened and closed states, thereby effectively addressing the technical issue that the gate may be pulled with a rigid sheet to be illegally opened.

DETAILED DESCRIPTION

For further illustrating the novel gate device according to the present application, the novel gate device is further described in detail in conjunction with drawings of a preferred embodiment of the present application.

Figure 1:
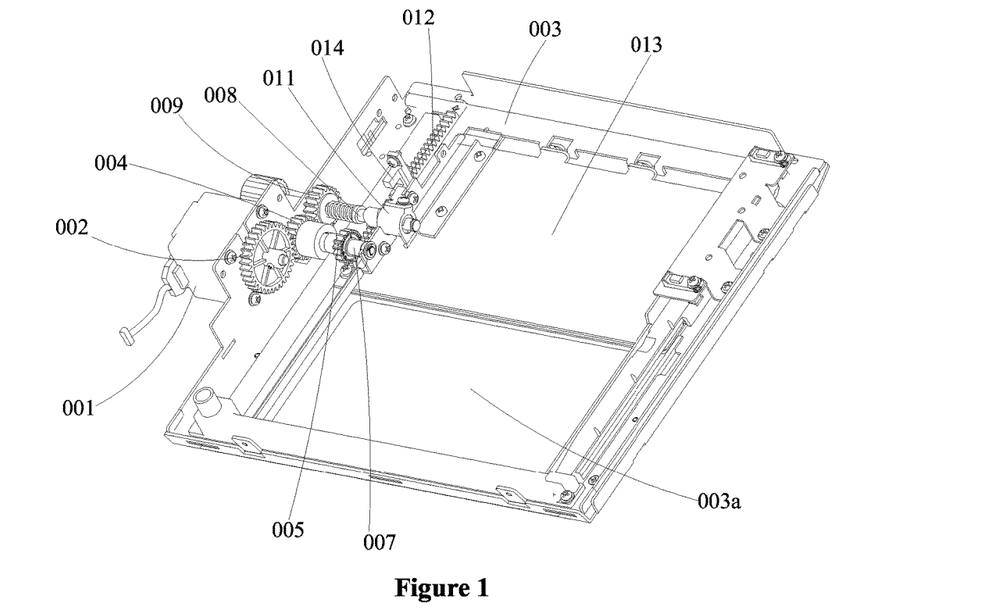
FIG. 1 is a schematic perspective view of a novel gate device according to the present application.
Figure 2:
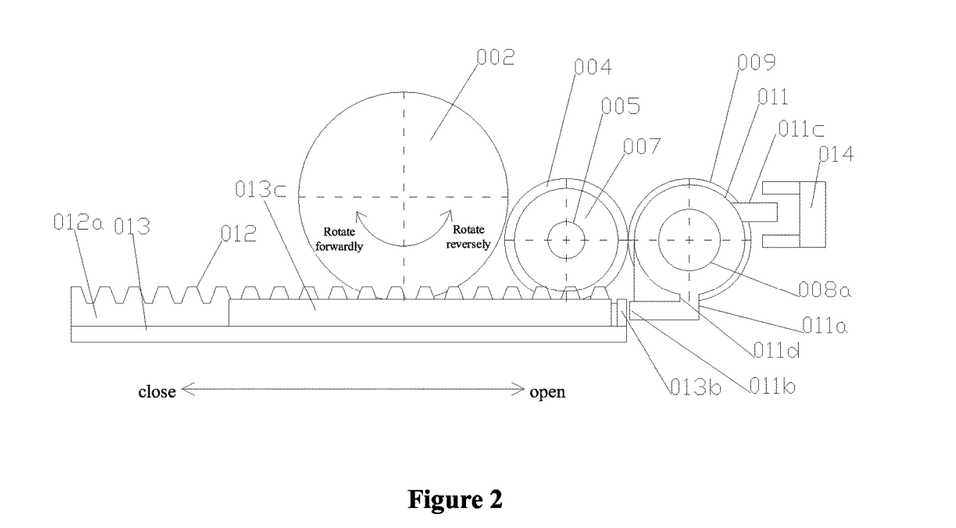
FIG. 2 is a first schematic view showing the structural principle of the gate device in FIG. 1.

As shown in FIGS. 1 and 2, the novel gate device includes a base plate 003, a gate 013, and a power system configured to drive the gate to slide. The base plate 003 has an opening 003a, and the gate 013 is arranged at an inner side of the base plate 003. A rack 012 is arranged at an inner side of the gate 013 along an opening-closing direction. The gate 013 is driven by the power system to slide to open or close the opening 003a. The power system includes a power motor 001, a first transmission gear 004 and a third transmission gear 009. The power motor 001 has a power output gear 002, and the power motor 001 is a bi-directional motor. The first transmission gear 004 is assembled with the power output gear 002 in a meshing manner, and is configured to drive a second transmission gear 007 by a first transmission shaft 005, and the second transmission gear 007 is assembled with the rack 012 in the meshing manner, thereby driving the gate. The third transmission gear 009 is assembled with the first transmission gear 004 in the meshing manner, and is configured, by a screw rod 008, to drive a sleeve component 011 having an internal screw thread to make a reciprocation movement in a direction perpendicular to the sliding direction of the gate 013 on a plane in parallel with the gate 013. The gate 013 can be locked and unlocked through the reciprocation movement of the sleeve component 011. It is to be noted that, the solution providing convex columns on an inner wall of the sleeve component 011 to cooperate with the screw thread on the screw rod 008 may achieve the same technical effects as the solution providing the internal screw thread on the inner wall of the sleeve component 011 to cooperate with the screw thread on the screw rod 008.

Figure 3:
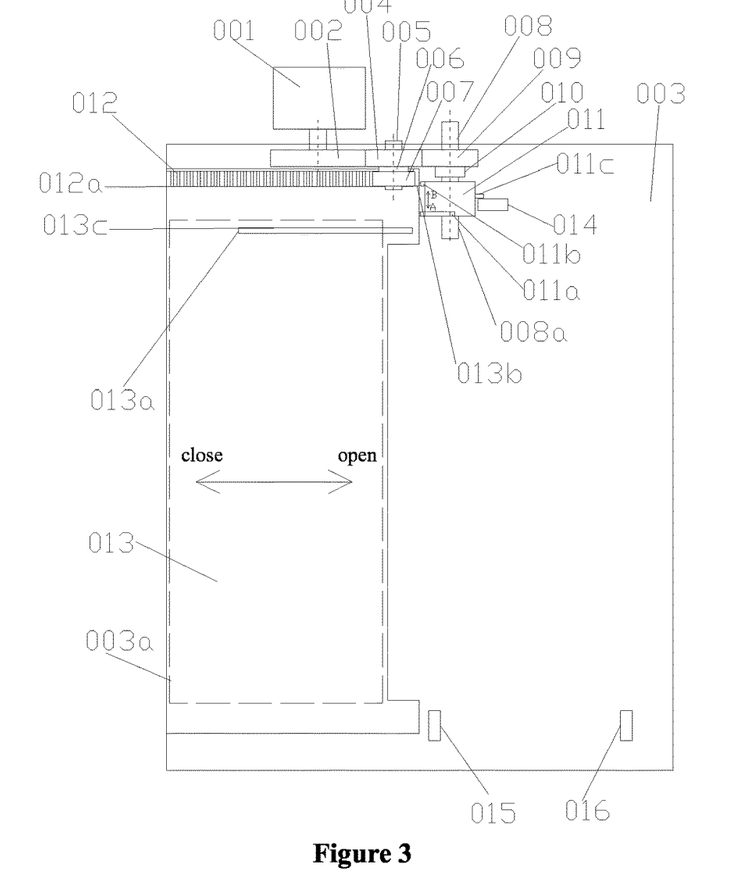
FIG. 3 is a second schematic view showing the structural principle of the gate device in FIG. 1.
Figure 4:
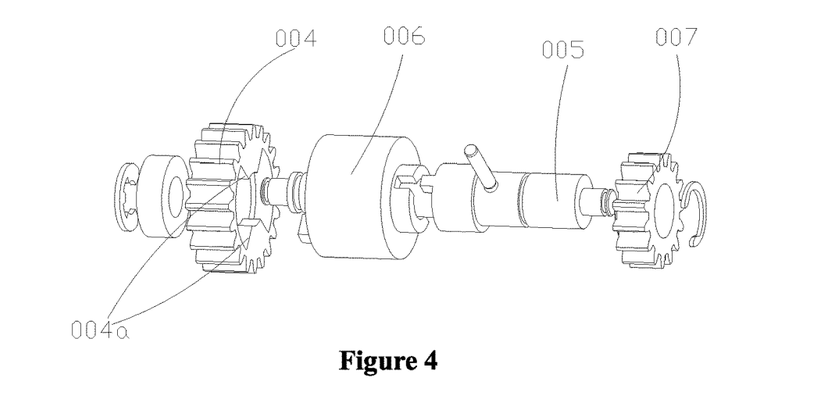
FIG. 4 is a schematic view of an assembly, configured to drive a gate to slide, of the gate device in FIG. 1.

Referring to FIGS. 3 and 4, for ensuring the reliability of the power system for driving the gate, a first slipping device 006 is provided between the first transmission gear 004 and the first transmission shaft 005, and a second slipping device 010 is provided between the third transmission gear 009 and the screw rod 008. The first slipping device 006 is a torque limiter. The second slipping device 010 includes a pressure spring and a shaft sleeve 010 fixed with respect to the second transmission shaft 008. The pressure spring is configured to provide a positive pressure between the shaft sleeve 010 and the third transmission gear 009. In the case that the second transmission shaft 008 is subjected to a resistance less than a designed value, the second transmission shaft 008 and the third transmission gear 009 rotate together. In the case that the second transmission shaft 008 is subjected to a resistance greater than the designed value, the second transmission shaft 008 does not rotate along with the third transmission gear 009, thus achieving the function similar to that of a torque limiter. Apparently, similar functions may also be achieved by employing a torque limiter or other assemblies.

For allowing the sleeve component 011 to reliably lock the gate 013, the sleeve component 011 is provided with an engaging foot 011b for retaining the gate 013. For preventing the sleeve component 011 from rotating along with the screw rod 008, one side, close to the base plate 003, of the sleeve component 011 is provided with a restricting platform 011d configured to restrict the sleeve component 011 from rotating along with the screw rod 088. The gate 013 is provided with an engaging arm 013b configured to selectively engage with the engaging foot 011b arranged on the sleeve component 011.

For limiting the maximum displacement point of the sleeve component 011, the sleeve component 011 is provided with a protruding side wall 011a at a side close to the base plate 003, and correspondingly, the gate is provided with a stop strip 013a corresponding to the protruding side wall 011a in a horizontal direction, and the stop strip 013a has a stop side wall 013c.

Referring to FIG. 3, for sensing, determining and checking whether the sleeve component 011 is moved to a designated position, it is required to provide a first sensor 014, and the sleeve component 011 is provided with a detecting arm 011c configured to be selectively sensed by the first sensor 014. Similarly, for sensing and determining whether the gate 013 slides to a designated position, it is further required to provide an opening position detecting sensor 016 configured to detect whether the gate is opened fully and a closing position detecting sensor 015 configured to detect whether the gate is closed fully.

Reference is made to FIG. 4. The first transmission gear 004 and the first transmission shaft 005 can rotate with respect to each other. The second transmission gear 007 and the first transmission shaft 005 are fixedly connected and cannot rotate with respect to each other. A torque not greater than an allowable value is transmitted between the first transmission gear 004 and the first transmission shaft 005 by the first slipping device 006. In the case that the gate 013 is subjected to a resistance greater than the allowable value, the first slipping device 006 slips, and at this time, the first transmission shaft 005 and the second transmission gear 007 do not rotate along with the first transmission gear 004, that is, when the gate is opened or closed fully, the first slipping device slips to allow the gate to keep still, and at this time, the second slipping device 10 does not slip, thereby ensuring that the sleeve component 011 can move along the locking/unlocking direction. Furthermore, the first slipping device 006 may further prevent damages to the user caused by forcible sliding of the gate.

Figure 5:
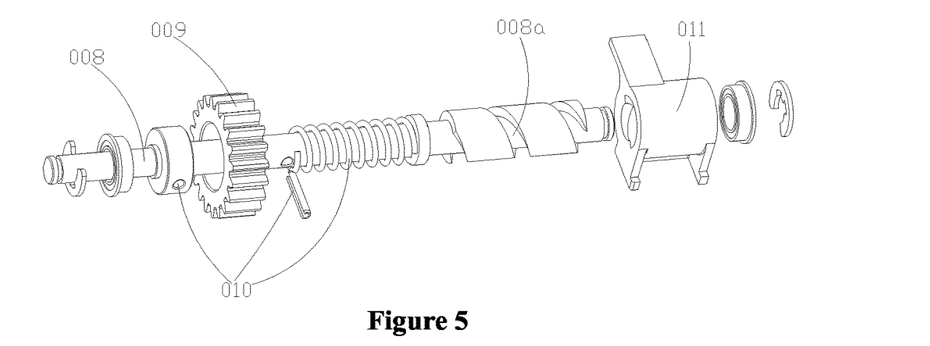
FIG. 5 is a schematic view of a gate locking assembly of the gate device in FIG. 1.

Reference is made to FIG. 5. The third transmission gear 009 and the screw rod 008 can rotate with respect to each other. A torque not greater than an allowable value is transmitted between the third transmission gear 009 and the screw rod 008 by the second slipping device 010. In the case that the screw rod 008 is subjected to a resistance greater than the allowable value, the second slipping device 010 slips, and the screw rod 008 does not rotate along with the third transmission gear 009, that is, in the process of opening or closing the gate, when the sleeve component 011 moves to a position where the sleeve component 011 abuts against the stop feature at the side edge of the gate 013, the second slipping device slips and the first slipping device does not slip, thereby ensuring that the gate 013 can continue moving in the opening/closing direction.

Figure 6:
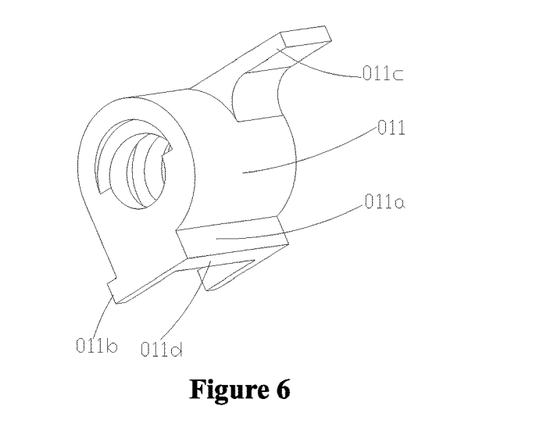
FIG. 6 is a schematic perspective view of a sleeve component of the gate locking assembly in FIG. 5.

Referring to FIGS. 5 and 6, the screw rod 008 has a threaded segment 008*a*, and correspondingly, an inner hole of the sleeve component 011 has a screw thread in cooperation with the screw thread of the threaded segment 008*a*. The threaded segment 008*a* transmits power to the sleeve component 011 by screw transmission, and the restricting platform 011*d* restricts the sleeve component 011 from rotating, to make the sleeve component 011 to move linearly along an axial direction of the screw rod 008, and thus the sleeve component 011 makes a reciprocating linear movement as the screw rod 008 rotates forwardly and reversely. Apparently, providing convex columns on the inner wall of the sleeve component 011 to cooperate with the screw thread on the screw rod 008 may achieve this technical effect as well.

Figure 7:
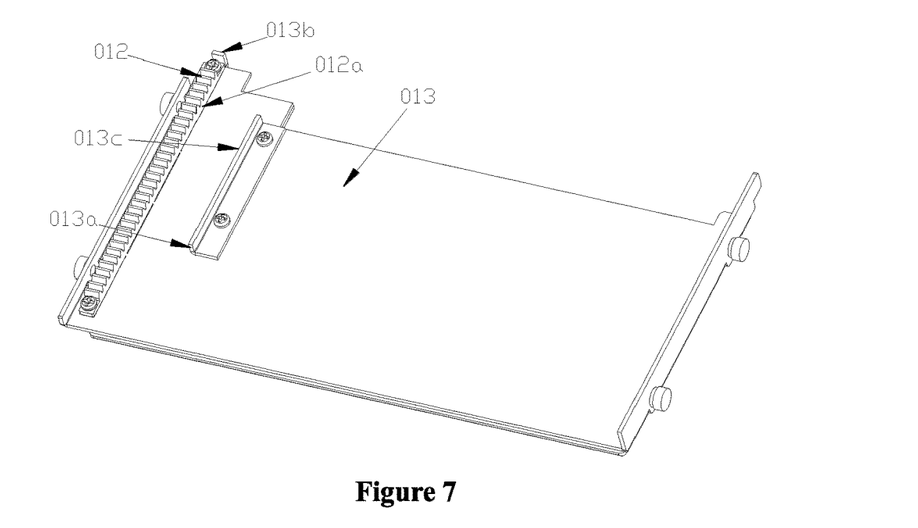
FIG. 7 is a schematic perspective view of a gate assembly of the gate device in FIG. 1.
Figure 8:
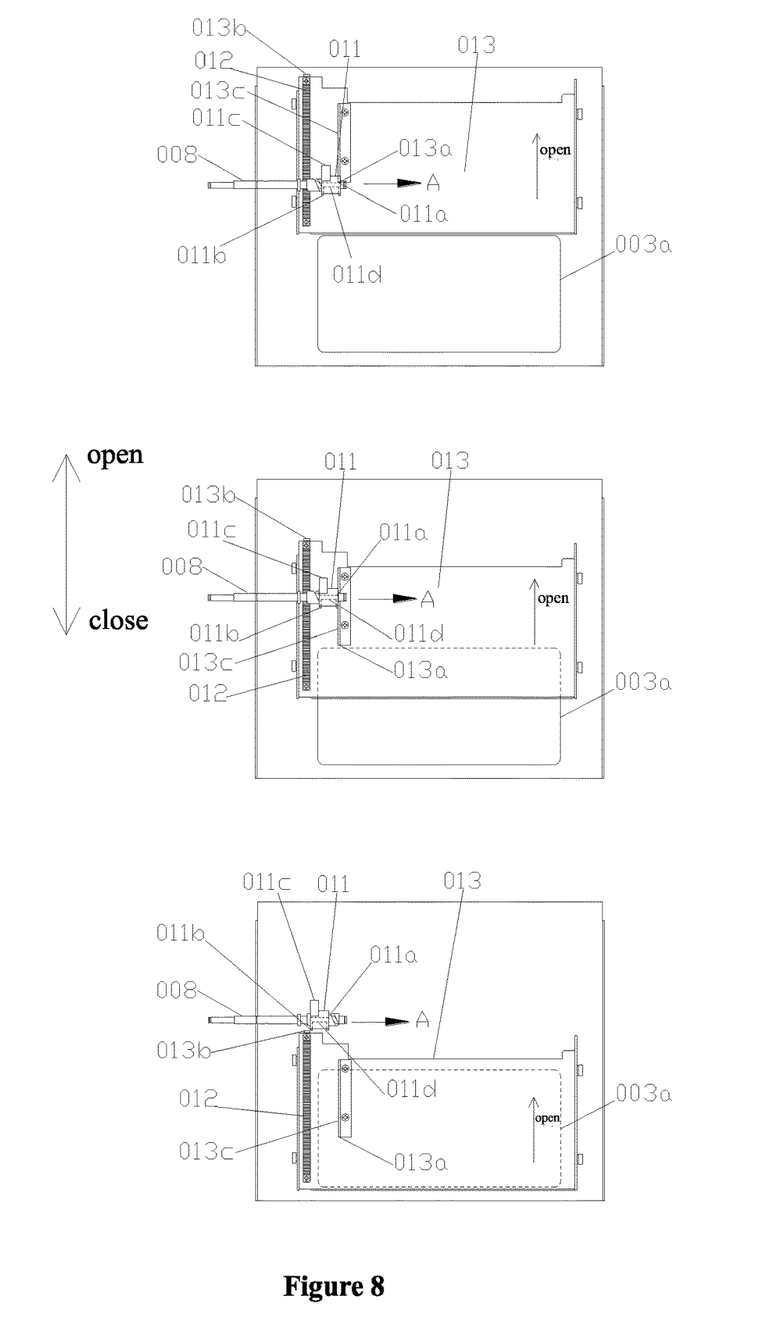
FIG. 8 is a schematic view showing states of the gate of the gate device in FIG. 1 in gate opening and closing processes.

Reference is made to FIGS. 6 and 7. The sleeve component 011 has the protruding side wall 011*a*, the engaging foot 011*b*, the detecting arm 011*c*, and the restricting platform 011*d*. The gate 013 has the stop strip 013*a*, the engaging arm 013*b*, the stop side wall 013*c* and the rack 012. The rack 012 is fixedly connected to the gate 013, and the rack 012 has a stop side wall 012*a* configured to limit the sleeve component 011. Reference is made to FIG. 8 which is a schematic view showing the positional relationship between the sleeve component 011 and the gate 013 in the relative moving process. When the gate is in a closed state, i.e., after the gate is closed fully, the engaging foot 011*b* and the engaging arm 013*b* facing each other are engaged to lock the gate 013. When the gate is opened fully, the protruding side wall 011*a* and the stop strip 013*a* facing each other abut and rub against each other, to lock the gate 013 in the opened state. Referring to FIG. 3, the position of the sleeve component 011 is determined by determining whether the first sensor 014 is blocked by the detecting arm 011*c*, thereby determining whether the engaging foot 011*b* fixedly arranged on the sleeve component is engaged with the engaging arm 013*b* fixedly arranged on the gate.

For allowing the gate 013 to slide smoothly on the base plate 003, the base plate 003 may be provided with at least one guide slot. Since the gate 013 is fixedly connected to the rack 012, and the rack 012 is engaged with the second transmission gear 007 to transmit power, to allow the gate 013 to linearly move along the guide slot of the base plate 003, to open or close the gate, and the moving direction is shown in FIG. 3.

The processes of opening and closing the gate device are described in detail hereinafter, in which the opening direction of the gate 013 is defined as a forward direction and the closing direction of the gate 013 is defined as a reverse direction.

Figure 9:
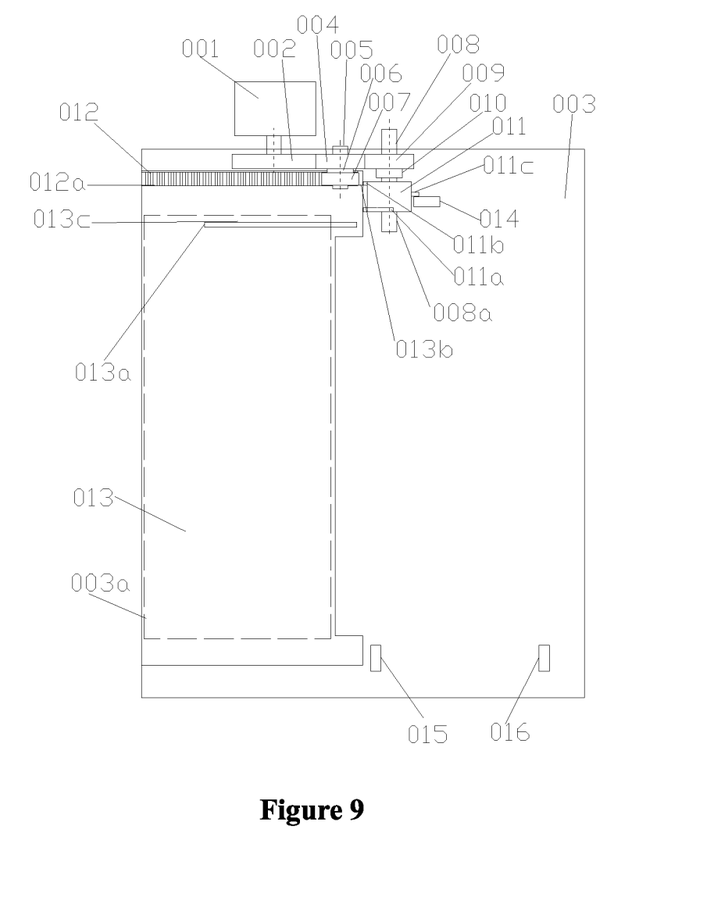
FIG. 9 is a schematic view showing the gate of the gate device in FIG. 1 being closed fully.

Generally, as shown in FIG. 9, in the case that the gate 013 is closed fully, the engaging foot 011*b* and the engaging arm 013*b* facing each other are engaged with each other, thus locking the gate 013.

Figure 10:
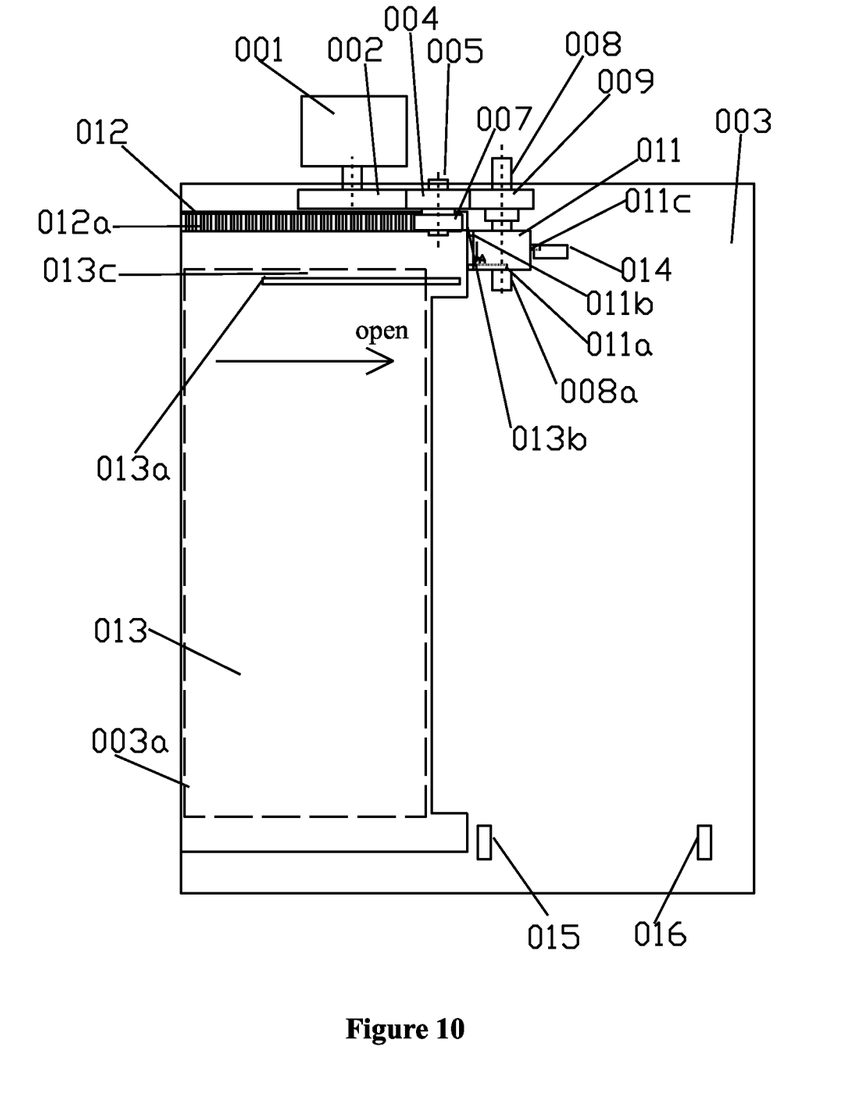
FIG. 10 is a schematic view showing the state of the gate of the gate device in FIG. 1 at the initial stage of the opening process.

As shown in FIG. 10, when a main control board (not illustrated) receives a command of opening the gate 013, and then sends a command to control the power motor 001 to rotate forwardly, the power motor 001 drives the first transmission gear 004 to rotate by the engagement between the power output gear 002 and the first transmission gear 004, and drives the third transmission gear 009 to rotate by the engagement between the third transmission gear 009 and the first transmission gear 004. At this time, the engaging foot 011*b* and the engaging arm 013*b* are in an engaged state, which makes the resistance generated by the gate 013 to the first transmission shaft 005 to be greater than a torque limit value of the first slipping device 006, and at this time, the first slipping device 006 slips, and the gate 013 keeps still. While, the rotation of the third transmission gear 009 allows the relative rotating force between the screw rod 008 and the third transmission gear 009 to be less than a torque limit value of the second slipping device 010, therefore, the second slipping device 010 does not slip, and the third transmission gear 009 drives the screw rod 008 to rotate. The threaded segment 008*a* transmit power to the sleeve component 011 by screw transmission, and the restricting platform 011*d* restricts the sleeve component 011 from rotating, to allow the sleeve component 011 to move linearly along the axis of the screw rod 008 in a direction A as shown in FIG. 10, till the engaging foot 011*b* is not in contact with the engaging arm 013*b* in the axial direction of the screw rod 008, and at this time, the protruding side wall 011*a* is not in contact with the stop side wall 013*c* in the axial direction of the screw rod 008, and therefore, the unlocking operation of the gate 013 in the opening process is achieved.

Figure 11:
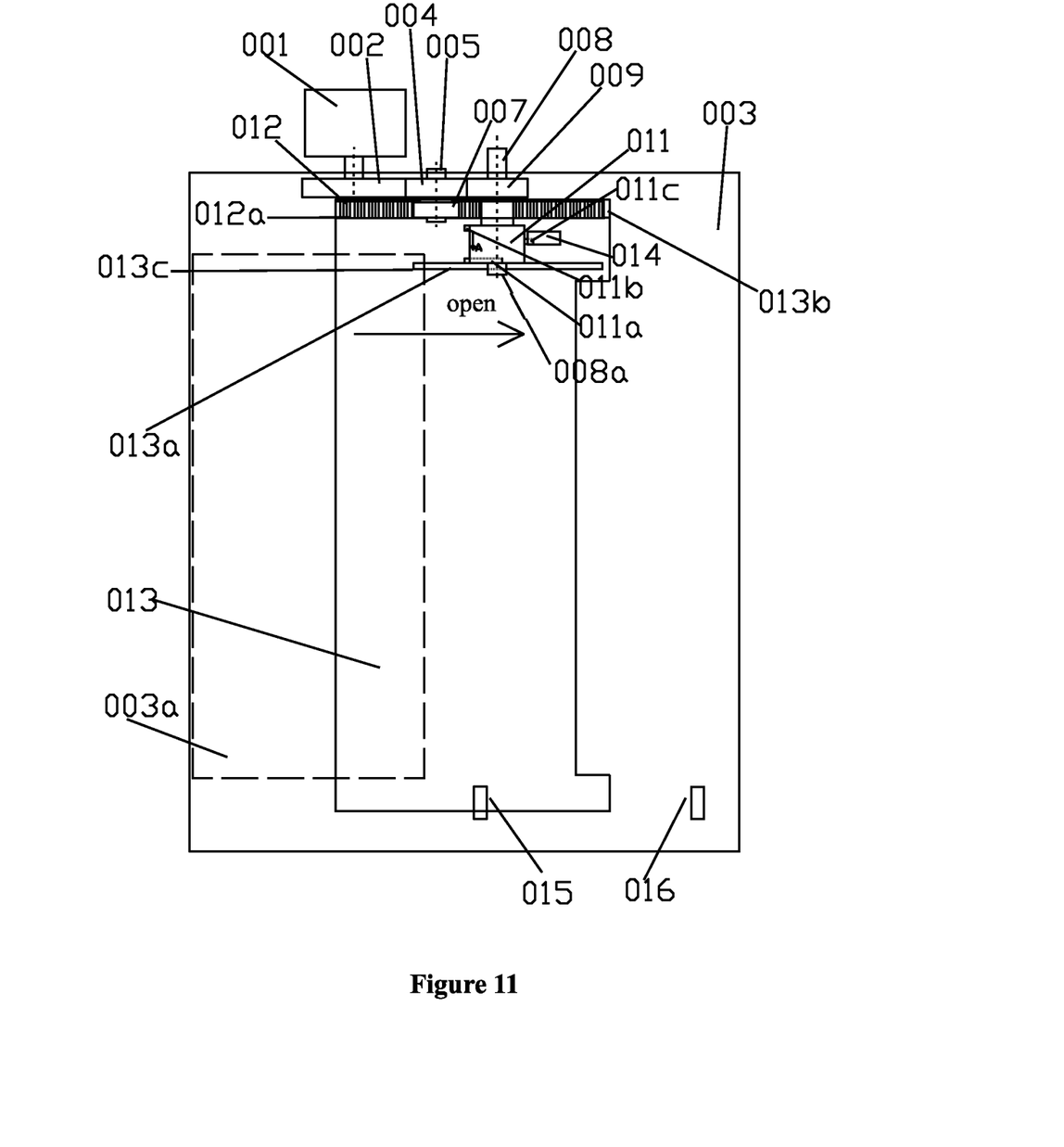
FIG. 11 is a schematic view showing the state of the gate of the gate device in FIG. 1 during the opening process.

As shown in FIG. 11, in the process of opening the gate, the power motor 001 continues rotating forwardly, and after the unlocking operation is achieved, since the engaging foot 011*b* is not in contact with the engaging arm 013*b*, and the protruding side wall 011*a* of the sleeve component 011 has not yet come into contact with the stop side wall 013*c*, the resistance generated by the gate 013 to the first transmission shaft 005 is reduced, and is less than the torque limit value of the first slipping device 006, and at this time, the first slipping device 006 does not slip, and the first transmission gear 004 drives the first transmission shaft 005 and the second transmission gear 007 to rotate together, the second transmission gear 007 is engaged with the rack 012, thereby driving the rack 012 and the gate 013 fixedly connected to the rack 012 to move linearly along the guide slot of the base plate 003, and the moving direction is the gate opening direction as shown in FIG. 11. In the process of opening the gate, the sleeve component 011 moves linearly along the axis of screw rod 008 in the direction A as shown in FIG. 11, and after the protruding side wall 011*a* of the sleeve component 011 comes into contact with the stop side wall 013*c*, the resistance generated by the gate 013 to the screw rod 008 is greater than the torque limit value of the second slipping device 010, and at this time, the second slipping device 010 slips, and the screw rod 008 stops rotating, and the sleeve component 011 keeps still, while the gate 013 can continue moving in the opening direction, till being opened fully.

Figure 12:
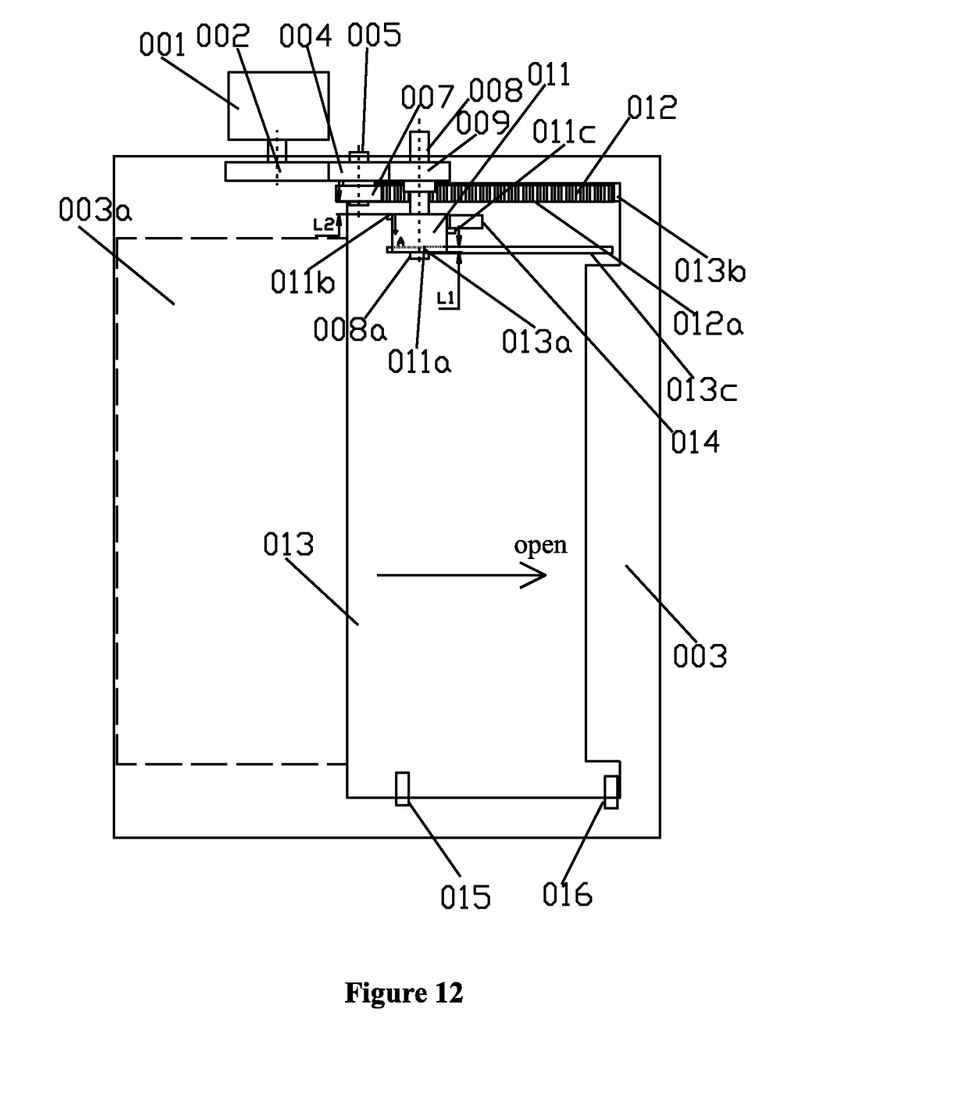
FIG. 12 is a schematic view showing the state of the gate of the gate device in FIG. 1 when the gate is opened fully.

As shown in FIG. 12, as the gate is opened further, the power motor 001 continues rotating forwardly, to allow the gate 013 to be opened fully, and at this time, the gate 013 is subjected to a resistance from the base plate 003, which makes the resistance on the first transmission shaft 005 generated by the gate 013 to be greater than the torque limit value of the first lipping device 006, and at this time, the first slipping device 006 slips and the gate 013 keeps still. In this case, the protruding side wall 011*a* of the sleeve component 011 is not in contact with the stop side wall 013*c*, and the resistance applied to the screw rod 008 is less than the torque limit value of the second slipping device 010, and at this time, the second slipping device 010 does not slip, the screw rod 008 rotates along with the third transmission gear 009, and the threaded segment 008*a* transmits power to the sleeve component 011 by screw transmission. The restricting platform 011d restricts the sleeve component 011 from rotating, to allow the sleeve component 011 to move linearly along the axis of the screw rod 008 in the direction A as shown in FIG. 12, and then the protruding side wall 011a comes into contact with the stop strip 013a in the axial direction of the screw rod 008, till the sleeve component 011 moves to a predetermined position. At this time, the protruding side wall 011a on the sleeve component 011 engages with the stop strip 013a, to lock the gate 013 in the opened state. At this time, the power motor 001 stops rotating, and the opening process of the gate is finished.

Figure 13:
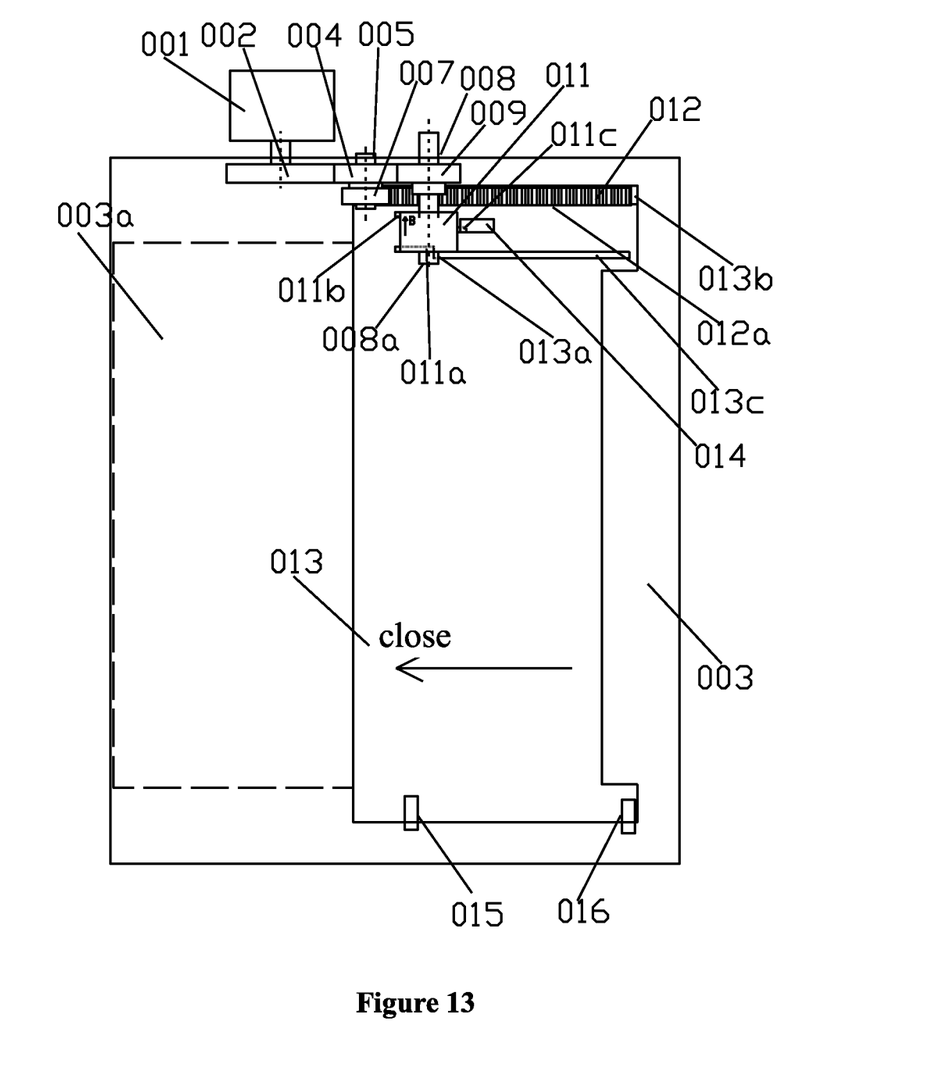
FIG. 13 is a schematic view showing the state of the gate of the gate device in FIG. 12 at the initial stage of the closing process.

As shown in FIG. 13, when the customer finishes the operation and needs to close the gate 013, the main control board (not illustrated) sends a command of closing the gate 013, to control the power motor 001 to rotate reversely. The power motor 001 drives the first transmission gear 004 and the third transmission gear 009 to rotate by the power output gear 002. At this time, the protruding side wall 011a and the stop strip 013a face each other and are engaged with each other, and then the resistance on the first transmission shaft 005 generated by the gate 013 is greater than the torque limit value of the first slipping device 006, and in this case, the first slipping deice 006 slips and the gate 013 keeps still. While the resistance applied to the screw rod 008 is less than the torque limit value of the second slipping device 010, thus the second slipping device 010 does not slip, and the third transmission gear 009 drives the screw rod 008 to rotate, to allow the sleeve component 011 to move linearly along the axis of the screw rod 008 in the direction B as shown in FIG. 13, till the protruding side wall 011a comes out of contact with the stop strip 013a in the axial direction of the screw rod 008, and at this time, the engaging foot 011b and the stop side wall 012a are not in contact with each other in the axial direction of the screw rod 008. Therefore, the unlocking operation in the closing process of the gate 013 is realized.

Figure 14:
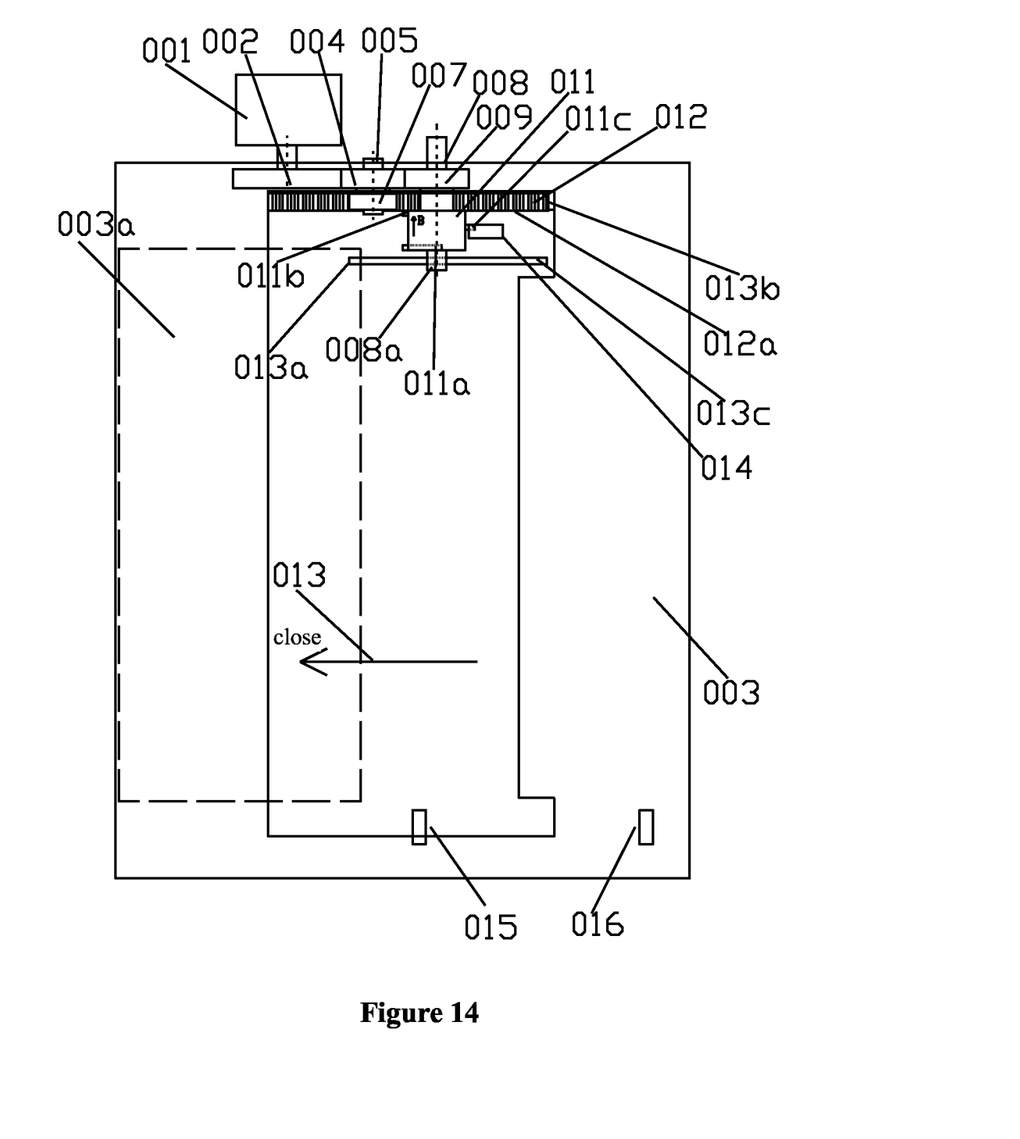
FIG. 14 is a schematic view showing the state of the gate of the gate device in FIG. 12 during the closing process.

As shown in FIG. 14, in the process of closing the gate, the power motor 001 continues rotating reversely, and since the protruding side wall 011a is no longer in contact with the stop strip 013a and the protruding side wall 011a of the sleeve component 011 is not in contact with the stop side wall 012a, the resistance on the first transmission shaft 005 generated by the gate 013 is reduced and is less than the torque limit value of the first slipping device 006, and at this time, the first slipping device 006 does not slip, and the first transmission gear 004 drives the first transmission shaft 005 and the second transmission gear 007 to rotate together, the second transmission gear 007 is engaged with the rack 012 to drive the rack 012 and the gate 013 fixedly connected to the rack 012 to move linearly along the guide slot of the base plate 003, and the moving direction is the closing direction of the gate as shown in FIG. 14. In the process of closing the gate 013, the sleeve component 011 moves linearly along the axis of the screw rod 008 in the direction B as shown in FIG. 14, and after the side edge of the engaging foot 011b comes into contact with the stop side wall 012a, the resistance on the screw rod 008 generated by the gate 013 is greater than the torque limit value of the second slipping device 010, and at this time, the second slipping device 010 slips, and the screw rod 008 stops rotating, the sleeve component 011 stops moving, and the gate 013 continues moving in the closing direction till being closed fully.

Figure 15:
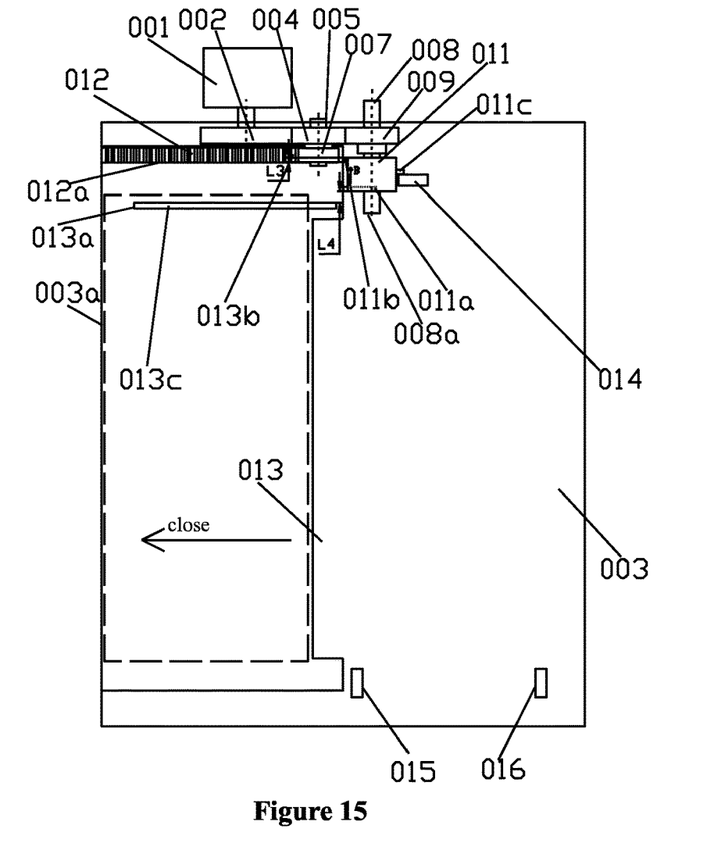
FIG. 15 is a schematic view showing the state of the gate of the gate device in FIG. 12 when the gate is closed fully.

As shown in FIG. 15, in the process of locking the gate in the closed state, the power motor 001 continues rotating reversely, and when the gate 013 is closed fully, the gate 013 is subjected to a resistance from the base plate 003, thus the resistance on the first transmission shaft 005 generated by the gate 013 is greater than the torque limit value of the first slipping device 006, at this time, the first slipping device 006 slips and the gate 013 keeps still. At this time, the protruding side wall 011a of the sleeve component 011 is not in contact with the stop side wall 012a, and the resistance applied on the screw rod 008 is less than the torque limit value of the second slipping device 010, the second slipping device 010 does not slip, and the screw rod 008 rotates along with the third transmission gear 009, to allow the sleeve component 011 to move linearly along the axis of the screw rod 008 in the direction B as shown in FIG. 15. The engaging foot 011b comes to contact with the engaging arm 013b in the axial direction of the screw rod 008, till the sleeve component 011 moves to a predetermined position, and then the power motor 001 stops rotating, and the closing process of the gate is finished.

Figure 16:
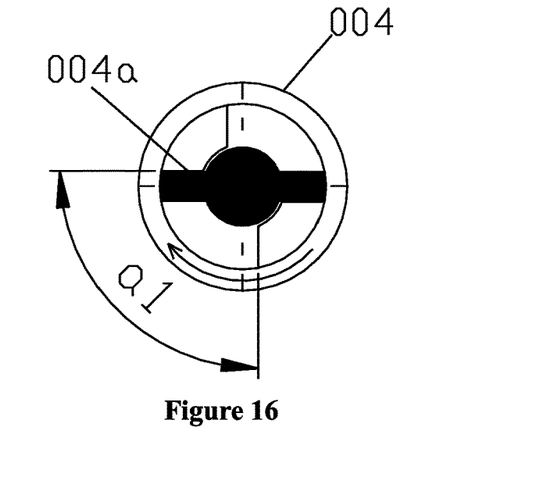
FIG. 16 is a design schematic view showing a first transmission gear with a reduced resistance in the gate device in FIG. 1.

In the specific implementation process, as shown in FIG. 16, for reducing the resistance to rotation of the first transmission gear when opening or closing the gate 013, a cutting groove 004a may be additionally provided in the first transmission gear 004. The cutting groove 004a has an angle of a1, to allow the first transmission gear 004 to be in a state of rotating idly by the angle a1 in the gate opening process. A reasonable value for the angle a1 of the cutting groove of the first transmission gear 004 is determined according to the parameters, such as the pitch of the threaded segment 008a, the contact dimension (L3 in FIG. 15) of the contact portion of the engaging foot 011b in contact with the engaging arm 013b in the axial direction of the screw rod 008 when the gate 013 is closed fully, the contact dimension (L1 in FIG. 12) of the contact portion of the protruding side wall 011a in contact with the stop strip 013a in the axial direction of the screw rod 008 when the gate 013 is opened fully, the number of teeth of the first transmission gear 004, the number of teeth of the second transmission gear 007, the number of teeth of the third transmission gear 009, the distance (L4 in FIG. 15) from a side edge, at a side where the protruding side wall 011a is located, of the sleeve component 011 to the stop side wall 013c in the axial direction of the screw rod 008 when the gate is closed fully, and the distance (L2 in FIG. 12) from a side edge, at a side where the engaging foot 011b is located, of the sleeve component 011 to the stop side wall 012a in the axial direction of the screw rod 008 when the gate is opened fully.

The value of the angle a1 meets the following requirements. (1) The angle a1 by which the first transmission gear 004 rotates idly corresponds to a distance by which the sleeve component 011 moves in the axial direction of the screw rod 008, and the distance is required to be greater than the contact dimension (L3 in FIG. 15) of the contact portion of the engaging foot 011b in contact with the engaging arm 013b in the axial direction of the screw rod 008 when the gate is closed fully, and is required to be smaller than the distance (L4 in FIG. 15) from the side edge, at the side where the protruding side wall 011a is located, of the sleeve component 011 to the stop side wall 013c in the axial direction of the screw rod 008 when the gate is closed fully. (2) The angle by which the first transmission gear 004 rotates idly corresponds to the distance by which the sleeve component 011 moves along the axial direction of the screw rod 008, and the distance is required to be greater than the contact dimension (L1 in FIG. 12) of the contact portion of the protruding side wall 011a in contact with the stop strip 013a in the axial direction of the screw rod 008 when the gate is opened fully, and is required to be smaller than a distance (L2 in FIG. 12) from the side edge, at the side where the engaging foot 011b is located, of the sleeve component 011 to the stop side wall 012a in the axial direction of the screw rod 008 when the gate is opened fully.

In the specific implementation process, if the space permits, it may also consider arranging the racks 012 on two sides at an inner side of the gate 013, to open the gate more stably.

The above description is only preferred embodiments of the present application. It should be noted that, the above preferred embodiments should not be deemed as a limitation to the present application, and the scope of protection of the present application is defined by the claims of the present application. For the person skilled in the art, several improvements and modifications may be made to the present application without departing from the spirit and scope of the present application, and these improvements and modifications are also deemed to fall into the scope of protection of the present application.

The invention claimed is:

1. A gate device, comprising a base plate, a gate, and a power system configured to drive the gate to slide, the base plate having an opening, the gate being arranged on an inner side of the base plate, a rack being provided on an inner side of the gate in an opening-closing direction, and the gate being driven by the power system to slide to open or close the opening, wherein the power system comprises:
a power motor, wherein the power motor has a power output gear and is a bi-directional motor;
a first transmission gear, wherein the first transmission gear is assembled with the power output gear in a meshing manner, and configured to drive a second transmission gear by a first transmission shaft, and the second transmission gear is assembled with the rack in the meshing manner; and
a third transmission gear, wherein the third transmission gear is assembled with the first transmission gear in the meshing manner, and is configured to drive a sleeve component by a screw rod to make a reciprocation movement in a direction perpendicular to a sliding direction of the gate on a plane in parallel with the gate, and the reciprocation movement of the sleeve component is configured to lock and unlock the gate.

2. The gate device according to claim 1, wherein a first slipping device is provided between the first transmission gear and the first transmission shaft.

3. The gate device according to claim 1, wherein a second slipping device is provided between the third transmission gear and the screw rod.

4. The gate device according to claim 1, wherein the sleeve component is provided with an engaging foot configured to retain the gate.

5. The gate device according to claim 4, wherein the gate is provided with an engaging arm configured to selectively engage with the engaging foot arranged on the sleeve component.

6. The gate device according to claim 1, wherein the gate is provided with a stop strip at a side close to the sleeve component, and the stop strip is configured to limit a maximum stroke point of the movement of the sleeve component on the screw rod.

7. The gate device according to claim 6, wherein the stop strip abuts against the sleeve component when the gate is opened fully, to lock the gate.

8. The gate device according to claim 1, wherein the sleeve component is provided with a restricting platform at a side close to the base plate, and the restricting platform is configured to restrict the sleeve component from rotating along with the screw rod.

9. The gate device according to claim 1, wherein the gate device further comprises a first sensor configured to detect whether the sleeve component is moved to a designated position, and the sleeve component is provided with a detecting arm configured to be selectively sensed by the first sensor.

10. The gate device according to claim 1, further comprising an opening position detecting sensor configured to detect whether the gate is opened fully and a closing position detecting sensor configured to detect whether the gate is closed fully.

* * * * *